United States Patent [19]

Lange

[11] 4,115,032

[45] Sep. 19, 1978

[54] WINDMILL ROTOR

[76] Inventor: Heinz Lange, P.O. Box 1374, Merritt, Canada, V0K 3B0

[21] Appl. No.: 775,181

[22] Filed: Mar. 7, 1977

[51] Int. Cl.² .................................................. F03D 3/06
[52] U.S. Cl. .............................. 416/227 A; 416/197 A
[58] Field of Search ............... 416/227, 227 A, 197 A, 416/132 B, 133, 149, 150, 139, 23; 98/72

[56] References Cited

U.S. PATENT DOCUMENTS

| 227,842 | 5/1880 | Rudolph | 416/132 B |
| 725,829 | 4/1903 | Decker | 416/149 X |
| 1,706,163 | 3/1929 | Howe | 416/227 A |
| 1,766,765 | 6/1930 | Savonius | 416/132 B |
| 2,020,900 | 11/1935 | Methvin | 416/227 A |
| 3,267,833 | 8/1966 | Artis et al. | 416/227 A X |
| 3,918,839 | 11/1975 | Blackwell et al. | 416/227 A X |
| 4,020,565 | 5/1977 | Steffen | 416/227 A X |

FOREIGN PATENT DOCUMENTS

| 2,298,707 | 8/1976 | France | 416/227 A |
| 327,062 | 7/1935 | Italy | 416/197 A |
| 28,266 of | 1911 | United Kingdom | 416/227 A |

Primary Examiner—Everette A. Powell, Jr.

[57] ABSTRACT

An omnidirectional windmill rotor is formed of a number (preferably seven) identical blades arranged symmetrically around a vertical shaft to which their upper and lower ends are secured. The blades are bowed outwardly at their wider central portions to define a sphere-like "chamber", each blade having a curved trailing edge projecting outwardly beyond the leading edge of the adjacent blade in order to form a "scoop" to receive the wind and induce rotation of the shaft. The lower end of each blade is twisted to form a deflecting portion on which the wind impinges to generate an upward movement of air within the chamber, serving to lighten the weight of the rotor on its bearing. In a modified version, a further projecting secondary blade is secured to each main blade to enhance the scoop effect and to provide a gap between the main and secondary blades. This gap causes a "jet effect" at low speeds, which improves the self-starting ability of the rotor under low wind velocities, and, at high speeds, causes a braking effect that protects against overspeeding.

12 Claims, 13 Drawing Figures

WINDMILL ROTOR

This invention relates to a windmill rotor, that is to say, a device for converting the energy of wind into the mechanical rotation of a shaft and subsequently, if desired, into some other form of energy, such as by driving an electric generator or operating a pump or the like.

More specifically, the invention relates to a vertical shaft windmill rotor, i.e. a windmill rotor that turns about a vertical axis in absorbing the energy of the wind, the wind being assumed to travel in an essentially horizontal direction.

Vertical shaft windmills are known but have not come into wide practical use because of various disadvantages. In general they have not provided a very efficient conversion of wind energy to shaft energy, and have not been resistant to unfavourable weather conditions such as ice and snow.

The object of the present invention is to provide improvements in respect of these and other aspects of windmill operation, and in particular to provide a reliable windmill rotor that is:

(a) omnidirectional (the wind can come from any direction);
(b) self-starting, even with comparatively low wind velocities;
(c) reliable in operation under adverse conditions;
(d) efficient in terms of energy conversion and reduction of energy losses; and
(e) capable of operation in high winds without overspeeding.

To achieve these and related aims the present invention provides a windmill rotor comprising
(a) a vertically extending shaft;
(b) a plurality of at least three identical, plate-like, main blades arranged symmetrically around said shaft, each having a narrow upper end and a narrow lower end;
(c) means securing the upper ends of the blades to the shaft at a common upper location and means securing the lower ends of the blades to the shaft at a common lower location, each blade bowing outwardly between its ends whereby collectively the blades define a generally sphere-like chamber;
(d) each blade having a leading edge lying in a generally vertical plane and a convex trailing edge curving outwardly to define a central blade portion wider than said blade ends, at which central portions the trailing edges are spaced further from the shaft than the leading edges whereby each blade forms a scoop; and
(e) the lower end of each blade being twisted to form a deflecting portion inclined upwardly from its trailing to its leading edge whereby to generate an upward movement of air within said chamber.

The particular advantage that flows from the upwardly-deflecting, lower blade portions is described below in detail.

As an optional feature, the invention provides a modified rotor structure which has advantages at very low wind velocities, i.e. easier self starting, and at very high wind velocities, i.e. less of a tendency to overspeed. This modified structure provides a smaller secondary blade associated with each main blade in such a way as to form a gap between the two. This gap provides a useful "jet effect" at low speeds, but, at high speeds, due to flexing of the secondary blade under centrifugal force, results in a braking effect that can prevent the rotor from overspeeding.

Embodiments of these different structures and their detailed functions will now be described by way of example, in association with the accompanying drawings, in which.

Figure 1:
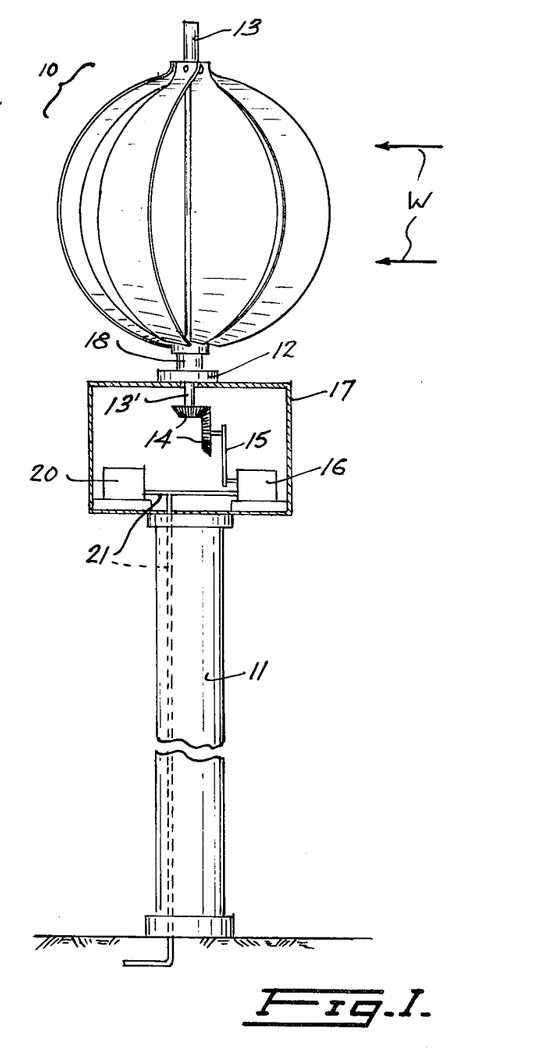
FIG. 1 is an elevation view, partly broken away, illustrating the general manner of mounting a first embodiment of a windmill rotor.

FIG. 1 shows a windmill rotor 10 supported on a pedestal 11 by means of a bearing 12. The rotor 10 has a shaft 13 extending throughout its entire length, a projecting portion 13' of which is connected to gearing 14 and hence via a belt drive 15 to a generator 16 mounted in a housing 17 forming part of the top of the pedestal 11. A bushing 18 forming part of a lower hub 19 (see FIG. 7) is secured to the shaft 13 and serves to support the assembly on the bearing 12 which is mounted on the top of the housing 17. It will be appreciated that this arrangement and particularly the mechanical drive in the housing 17 has been shown somewhat diagrammatically for simplicity, since these are essentially conventional components and do not form part of the inventive advance. Thus, the housing 17 is assumed to house a regulator 20 for controlling the voltage output of the generator 16, these components being connected together and to the exterior via cables 21.

FIG. 1 thus provides an indication of the general windmill environment in which the rotor 10 is likely to be used, namely at an elevated location so as to be exposed to wind W, the power generaged in the shaft being transported to the exterior by any convenient means, in this instance by electric power generated on the site. As will be apparent, numerous other methods of arranging and supporting the rotor 10 will be possible, and the power generated may be extracted mechanically instead of electrically.

Figure 2:
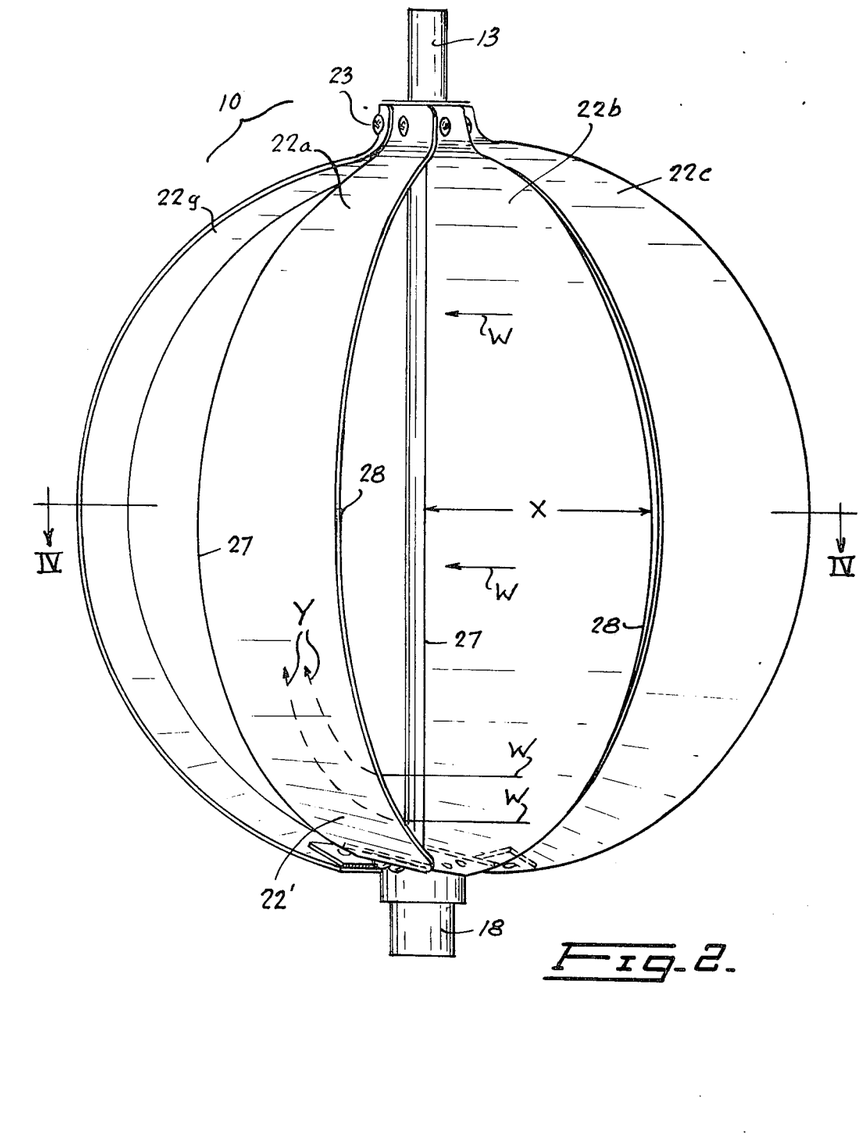
FIG. 2 is a larger scale, elevation view of the windmill rotor of FIG. 1, as seen on the line II—II in FIG. 3.
Figure 3:
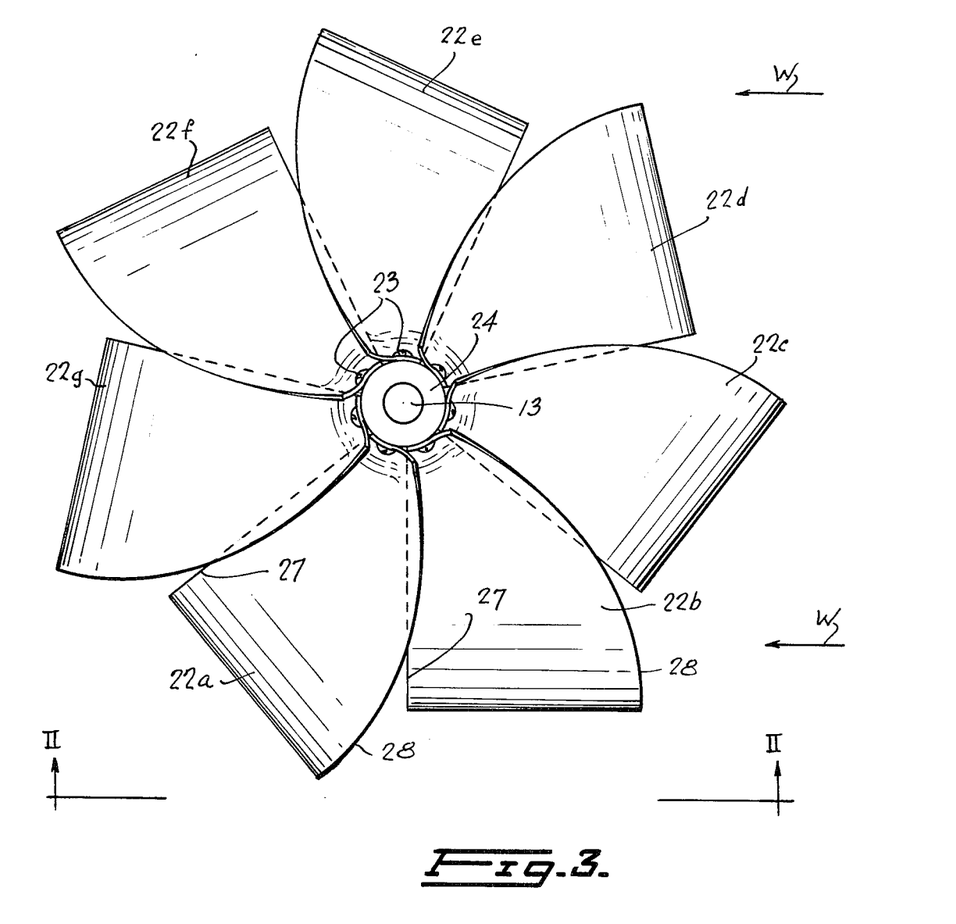
FIG. 3 is a plan view seen from the top of FIG. 2.
Figure 4:
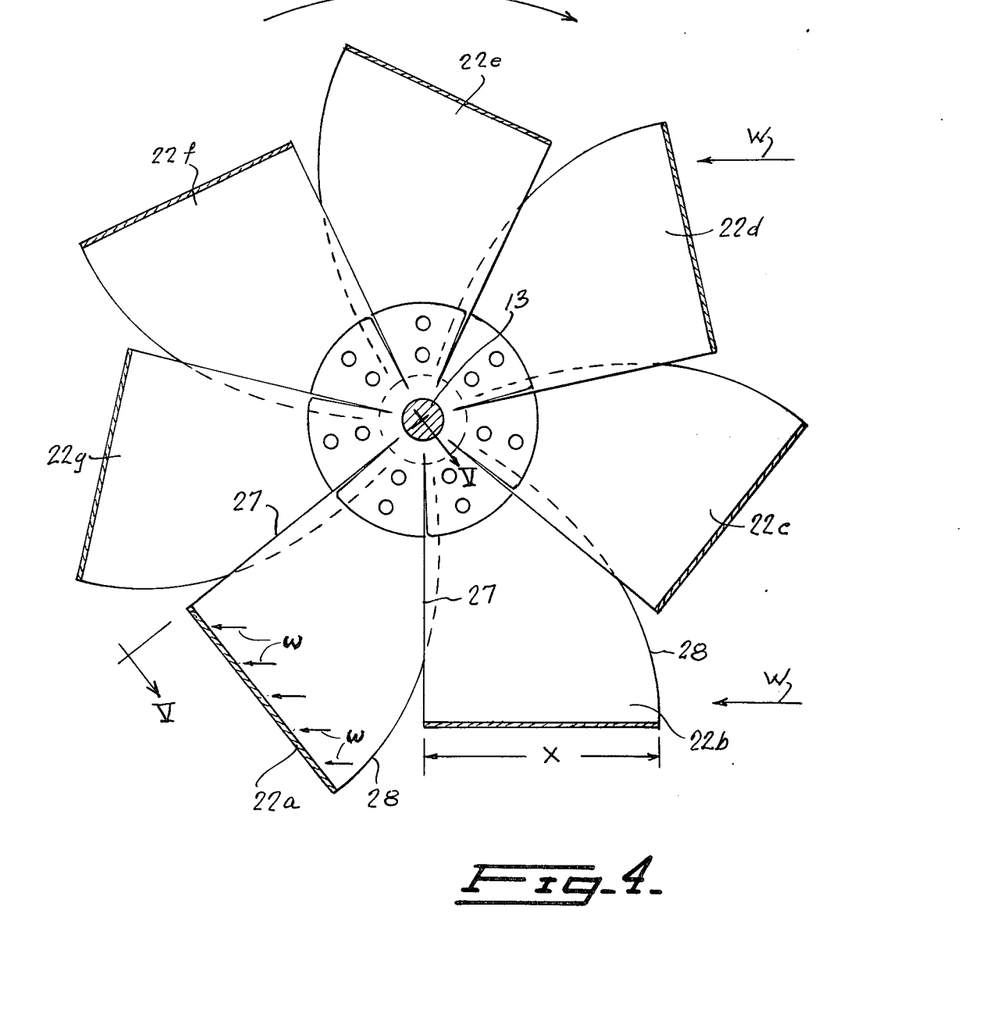
FIG. 4 is a horizontal cross-section taken along the line IV—IV in FIG. 2.
Figures 5, 6, 7:
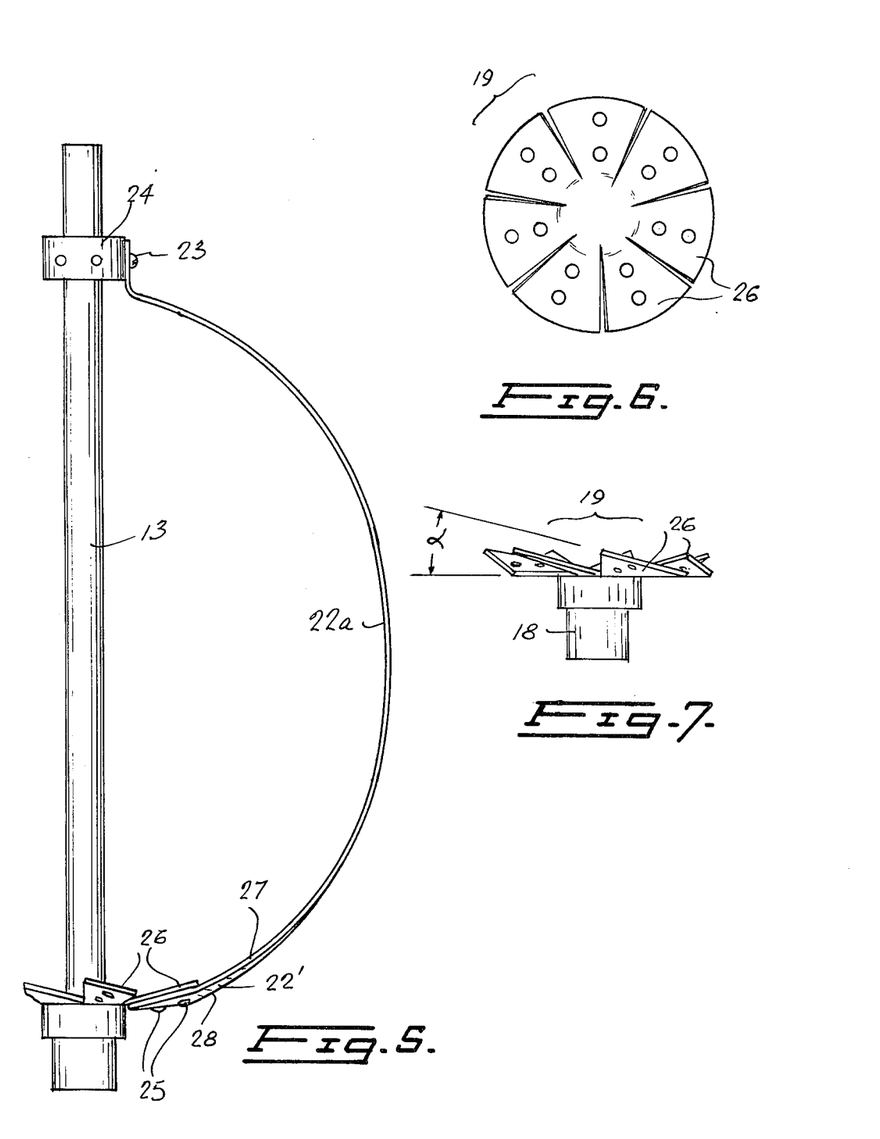
FIG. 5 is a view taken generally on the line V—V in FIG. 4, but with only one blade shown, the others being omitted for clarity.
FIG. 6 is a plan view of a fragment of the rotor of FIG. 2, being the lower hub of the device.
FIG. 7 is a side view of the hub of FIG. 6.
Figure 8:
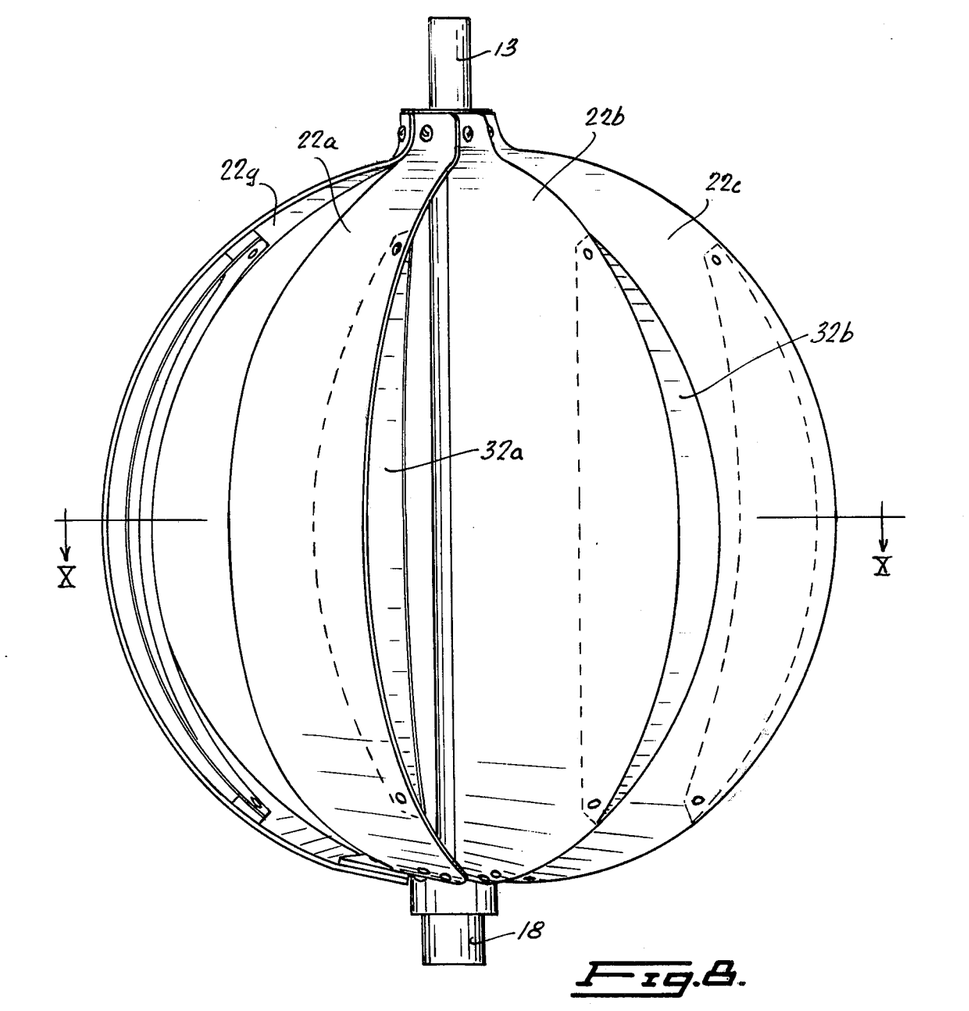
FIG. 8 is a view corresponding to FIG. 2 of a second embodiment of windmill rotor.
Figure 9:
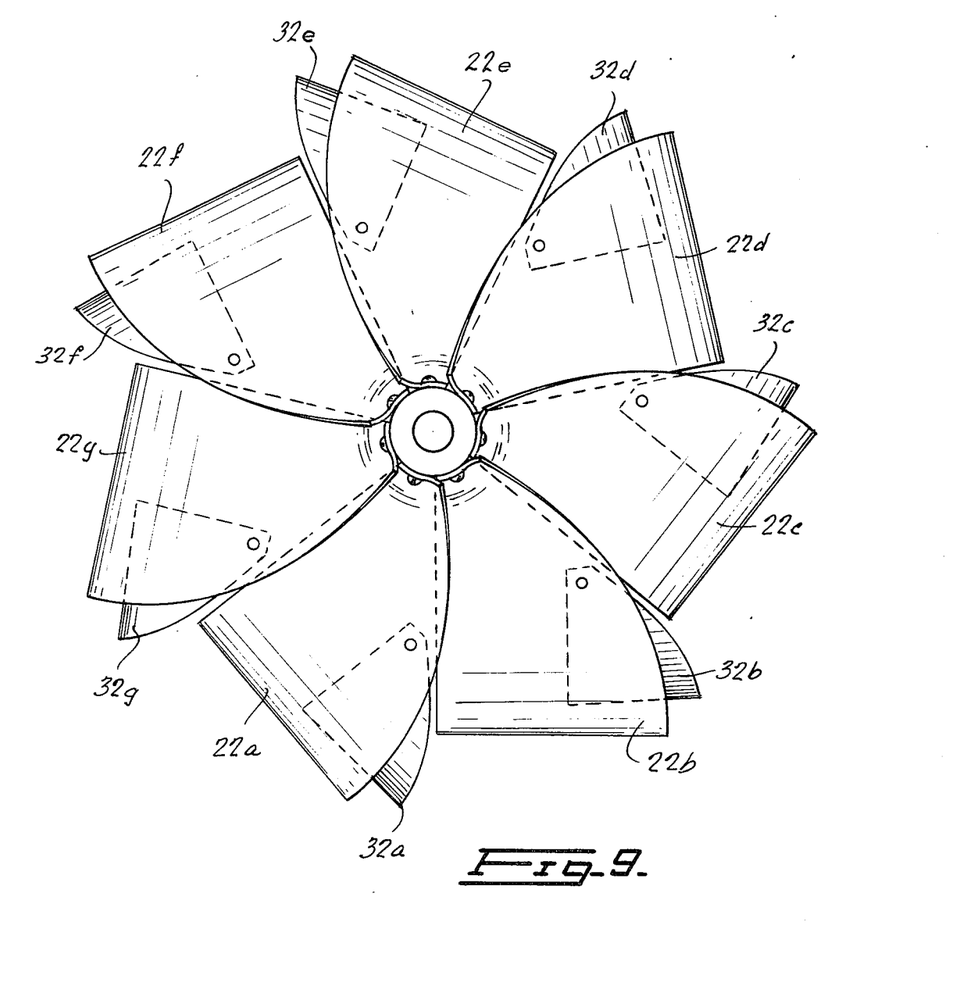
FIG. 9 is a view corresponding to FIG. 3 of the second embodiment.

The rotor itself is shown in FIGS. 2, 3 and 4 and will be seen to consist of seven identical blades 22a to g. Each blade is connected at its upper end through a rivet or screw connection 23 to an upper hub 24 secured to the upper end of the shaft 13. Each blade curves outwardly and downwardly in an arc, as perhaps best appreciated from FIG. 5, to be connected at its lower end by a screw or rivet connection 25 to one of seven arms 26 of the lower hub 19. As best seen in FIG. 7, each of these arms 26 is twisted at an angle α which is of the order of 15°, although this angle can be varied to accommodate varying circumstances, such as the size and power of the windmill and the expected strength of the wind with which it will be operating. As will be appreciated, this tilting of the arms 26 has the effect of tilting the lowermost portion 22' of each of the blades for a purpose that will be explained below.

As best appreciated from FIGS. 2 and 4 and taking the blade 22b as an example, each blade is formed from a strip of sheet metal. One edge 27 (which becomes the leading edge during rotation) is straight and extends substantially vertically, while the trailing edge 28 is convex, extending outwardly from its comparatively narrow ends to a central portion where the blade attains its maximum width X. The overall shape of the "chamber" defined within the seven blades is thus generally spherical, or more generally "spheroidal", since the position of the upper hub along the shaft 13 can be varied to flex the blades and form either a prolate or oblate spheroid. Indeed the exact manner of fixing the blade ends may vary and thus distort the pure geometry of the shape, so that even an "onion" shape may result. The important consideration is that the blades define, although not completely enclose, a generally spherical chamber which will herein be referred to as "spherelike".

Another essential feature of the shape of the windmill is that the blades provide "scoops" directed into the wind. In other words, and considering FIG. 3 or 4, it is essential that the trailing or "wind scooping" edge 28 of blade 22a, especially at its wide central portion, project further from the axis of the shaft 13 than the leading edge 27 of the next trailing blade 22b. Since the whole arrangement is symmetrical, this means that the distance from the shaft of all trailing edges is greater than that of all leading edges. If this were not so, the blades would tend to shield each other from the wind, which in the example, is assumed to be travelling in the direction indicated by the arrows W. The impact of the wind on the blade 22a, illustrated by the small arrows w will be to tend to rotate the assembly in a clockwise direction. While there will be some tendency for the wind acting on an opposite blade, for example the blade 22e, to retard this motion, the air which encounters the concave face of a blade, e.g. blade 22a, and enters the sphere-like chamber has a greater effect than the air which merely strikes an outer convex blade surface (blade 22e). As the windmill rotates, each blade momentarily occupies the position of the blade 22a in FIG. 4 and experiences the maximum effect of the wind.

While the leading edge 27 of each blade has been described as straight, a condition apparent from FIGS. 2, 3 and 4, it will be appreciated that when seen in the side view of FIG. 5, this edge at the same time exhibits the outward bowing curvature of the blade as a whole. This edge 27 is straight in the sense that the metal is cut to a straight edge before the blade is bent to its bow shape. Consequently it remains straight in the sense that it lies in a single plane, preferably, but not necessarily exactly, in a vertical plane extending through the center of the shaft 13. The curved trailing edge 28, however, is curved in two senses, both the bowing shown in FIG. 5 and the curvature shown in FIGS. 2, 3 and 4 which derives from the fact that the blade was cut from sheet metal with a curved edge.

In addition to these curvatures, the lower end of each blade is given a twist by virtue of its connection to one of the tilted arms 26 of the lower hub 19. As seen in FIG. 2, the effect of this twisting of the lower end 22' of the blade 22a is to present to the wind W a surface that is upwardly inclined in the direction of wind travel. This aspect can also be appreciated from the lower part of FIG. 5, bearing in mind that, in this figure, the wind is assumed to be coming vertically out of the paper on which this figure is drawn towards the blade end 22'. The trailing edge 28 which first receives the wind is lower than the leading edge 27 at this location; in other words, the blade is downwardly and forwardly inclined into the wind. The effect is that the air striking this lower portion 22' of the blade will tend to be deflected upwardly within the chamber formed within the blades. This upward force exerted on the wind will, of course, be balanced by a corresponding downward force on the blade. However, since the blade currently on the opposite side of the windmill, e.g. blade 22e, is experiencing the reverse effect, namely impingement of the wind on an upwardly and forwardly inclined undersurface at its lower end, the net effect is to balance out the upward and downward forces on the windmill.

On the other hand, the effect on the air is not so balanced. In the blade 22a, as already explained, the air receives an upward thrust into the sphere-like chamber by virtue of the inclination of the lower end 22' of this blade, whereas on the opposite side of the windmill the corresponding downward thrusting of the air is external to the windmill. The overall effect of this arrangement is that within the chamber defined by the blades the tilted lower ends of the blades have the effect of producing a net upward flow of air, as demonstrated by the arrows Y in FIG. 2. This effect of an upward flow of air within the chamber, which becomes especially noticable as the velocity of the wind W increases, acts on the upper inside faces of the blades to exert an upward force on the rotor as a whole and thus partially to support its weight. The effective weight of the rotor on the bearing 12 is consequentially reduced and the friction loss reduced accordingly.

This upward force on the rotor can be enhanced to some extent if the leading edge 27 of each blade is somewhat slanted. In other words, instead of this leading edge being truly vertical as described above and shown in the drawings, its top end can be located slightly in advance of its bottom end by an amount sufficient to give such leading edge a slant of about 5° to the vertical.

FIGS. 8 to 13 illustrate a second example of a windmill rotor embodying further optional features of the invention. This second form of rotor is the same as that shown in FIGS. 1 to 7, except for the addition of a secondary blade to each of the main blades. Consequently, the parts that remain unchanged will not be described again, but have simply been given the same reference numerals.

Secondary blades 32a to g are identical to each other and are secured to respective main blades 22a to g. Taking blade 32a as an example, it will be seen from FIGS. 11 and 12 to be similar in shape to, while smaller in size than, the main blade 22a, having a straight leading edge 37 and convex trailing edge 38. The top and bottom ends of the secondary blade 32a are secured by screw or rivet connections 39 and 40 to the main blade 22a. The secondary blade is made of lighter, more flexible metal, e.g. aluminum, than the main blade, which is preferably made of steel. Also the secondary blade is preferably weighted with a strip 42 of a suitable heavy material, such as lead.

Figure 10:
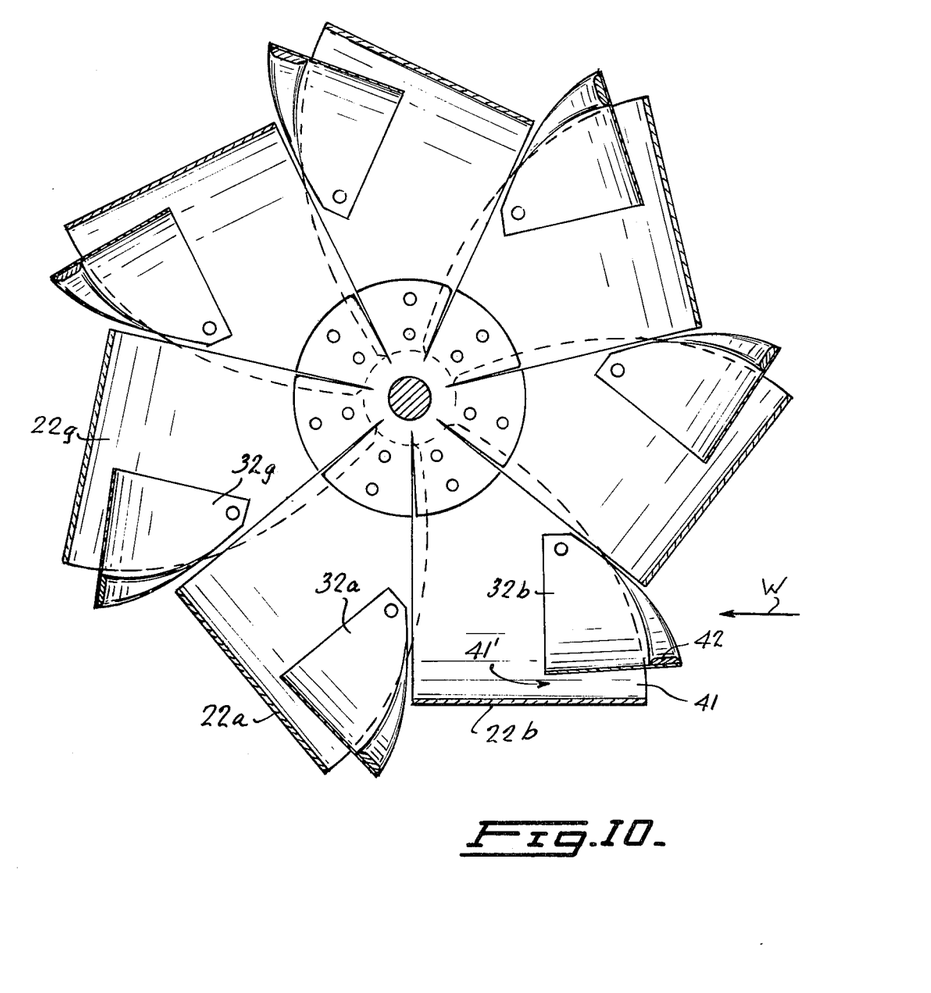
FIG. 10 is a view corresponding to FIG. 4 of the second embodiment.
Figures 11, 12, 13:
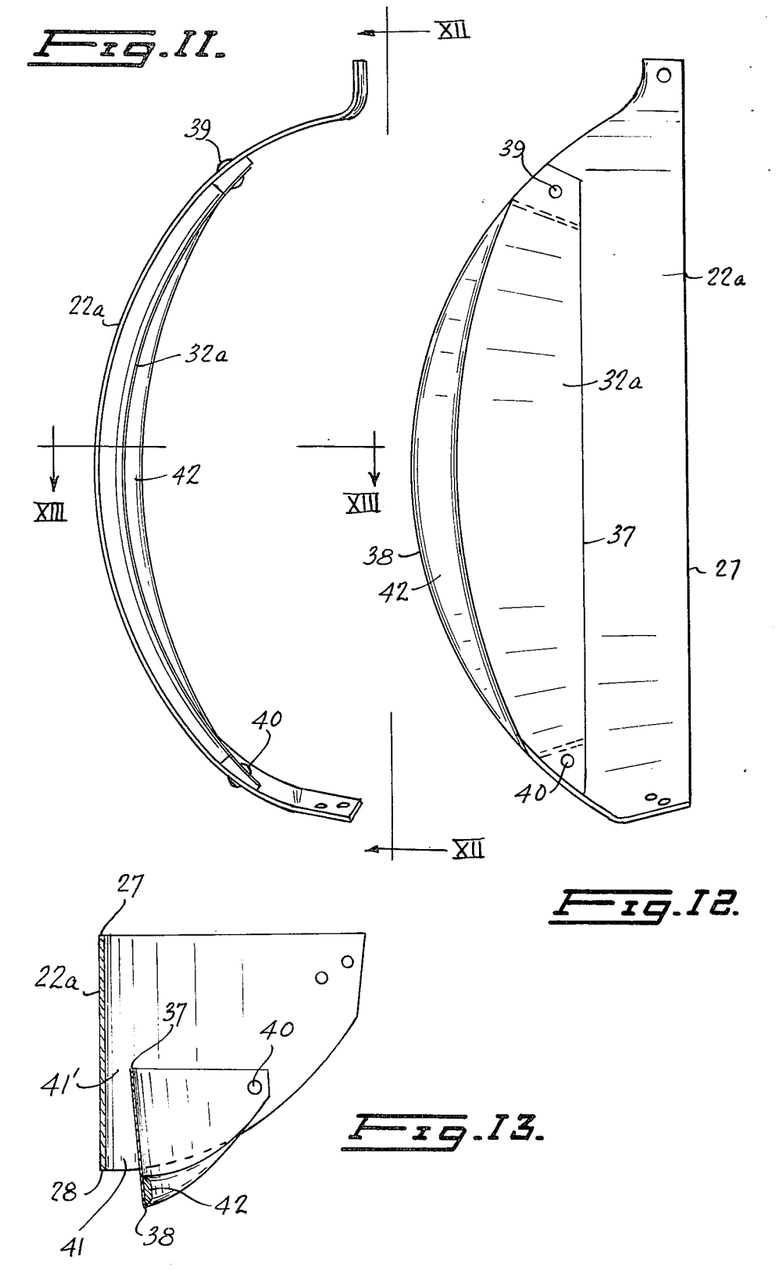
FIG. 11 is an elevation view of a single blade of the second embodiment.
FIG. 12 is a view taken on the line XII—XII in FIG. 11.
FIG. 13 is a section on the line XIII—XIII in FIG. 11.

The relative orientation of the main and secondary blades shown in FIG. 13 pertains to the static condition of the windmill and during rotation at relatively low speeds. It will be noted that the trailing edge 38 of each secondary blade projects beyond the trailing edge 28 of the main blade and this enhances the "scoop" effect as each blade assembly comes into the position in which it receives the maximum effect of the wind, i.e. the position occupied by the blade assembly consisting of blades 22a and 32a in FIG. 10. This feature tends to assist self-starting at very low wind velocities, i.e. down to 4 or 5 miles per hour.

In addition, when each blade assembly is in the position of the blades 22b and 32b in FIG. 10, there is a "jet effect" caused by wind entering a gap entrance 41 between the blades. This gap entrance 41 narrows to a smaller gap exit 41', thus causing an increase to the air velocity by the time it emerges into the chamber defined within the windmill. This "jet effect" has been found to improve the performance of the device.

As the windmill increases speed, the centrifugal force on the weighted trailing edge 38 of the secondary blade has the effect of narrowing the entrance gap 41, but the jet effect essentially remains. However, at high speed, the centrifugal force can almost close the gap 41 so that it is now narrower than the gap 41' and the secondary blade stands ready to act as a brake in the event of the windmill trying to run at a speed in excess of its rated speed, as a result, for example, of a sudden removal of the electrical load while operating in a high wind. The secondary blades thus also serve a safety function.

In the embodiments illustrated seven blades (or blade assemblies) have been shown. Although this is usually the preferred number, it can be varied. An odd number is preferred, since rotors with an odd number of blades tend to self-start more readily, even when exposed to only a light wind. A five-bladed rotor will work satisfactorily and even a six-bladed arrangement is acceptable in many locations. On the low side, the number of blades can go as low as three, but not two. However, with three blades, the power developed tends to be less than in a five or seven blade arrangement and it becomes more difficult to effectively define the sphere-like chamber within the blades. On the high side, the number can be increased above seven. For example, a nine-blade arrangement is good for locations in which the wind velocity tends to be rather low, and even eleven (as well as eight and ten) blades can be used. However, the higher the number of blades, the greater the mechanical problems involved, particularly in respect of fastening the blade ends. Also the blade width necessarily becomes thinner. There is theoretically no upper limit to the number of blades, although mechanical problems tend to make anything above nine blades less attractive in the majority of instances.

While the drawings and description have provided specific examples of the present invention, it is to be understood that many dimensional and other changes will be possible within the scope of the present invention, which is defined in the claims that follow.

I claim:
1. A windmill rotor comprising
(a) a vertically extending shaft;
(b) a plurality of at least three identical, plate-like, main blades arranged symmetrically around said shaft, each having a narrow upper end and a narrow lower end;
(c) means securing the upper ends of the blades to the shaft at a common upper location and means securing the lower ends of the blades to the shaft at a common lower location, each blade bowing outwardly between its ends whereby collectively the blades define a generally sphere-like chamber;
(d) each blade having a leading edge lying in a generally vertical plane and a convex trailing edge curving outwardly to define a central blade portion wider than said blade ends, at which central portions the trailing edges are spaced further from the shaft than the leading edges whereby each blade forms a scoop;
(e) the low end of each blade being sted to form a deflecting portion inclined upwardly from its trailing to its leading edge whereby to generate an upward movement of air within said chamber;
(f) a similar number of identical plate-like, secondary blades each smaller than and associated with a respective main blade and each having a narrow upper end, a narrow lower end and a wider central portion therebetween; and
(g) means securing the upper and lower ends of the secondary blades to their respective main blades at similar upper and lower locations thereon with a trailing edge of each secondary blade projecting beyond the trailing edge of its associated main blade and with a gap between the central portion of each secondary blade and the central portion of its associated main blade.

2. A windmill rotor according to claim 1, wherein the number of main blades is an odd number.

3. A windmill rotor according to claim 1, wherein the number of main blades is at least five.

4. A windmill rotor according to claim 1, wherein the number of main blades is seven.

5. A windmill rotor according to claim 1, wherein said upper location on the shaft is adjustable relative to the lower location whereby the degree of said bowing of the blades is variable.

6. A windmill rotor according to claim 1, wherein each said gap narrows from the trailing edge of the main blade in the direction of the leading edge of the main blade.

7. A windmill rotor according to claim 6, wherein each said secondary blade is more flexible than its associated main blade and is weighted so that at high rotational speeds said gap will be reduced in width by centrifugal force.

8. A windmill rotor according to claim 7, wherein such weighting of each secondary blade is concentrated at the trailing edge thereof whereby at high rotational speeds the direction of narrowing of said gap is reversed.

9. A windmill rotor comprising
(a) a vertically extending shaft;
(b) a plurality of at least three identical, plate-like, main blades arranged symmetrically around said shaft, each having a narrow upper end and a narrow lower end;
(c) means securing the upper ends of the blades to the shaft at a common upper location and means securing the lower ends of the blades to the shaft at a common lower location, each blade bowing outwardly between its ends whereby collectively the blades define a generally sphere-like chamber;

(d) each blade having a leading edge lying in a generally vertical plane and a convex trailing edge curving outwardly to define a central blade portion wider than said blade ends, at which central portions the trailing edges are spaced further from the shaft than the leading edges whereby each blade forms a scoop;

(e) a similar number of identical plate-like secondary blades each smaller than and associated with a respective main blade and each having a narrow upper end, a narrow lower end and a wider central portion therebetween; and (f) means securing the upper and lower ends of the secondary blades to their respective main blades at similar upper and lower locations thereon with a trailing edge of each secondary blade projecting beyond the trailing edge of its associated main blade and with a gap between the central portion of each secondary blade and the central portion of its associated main blade.

10. A windmill rotor according to claim 9, wherein each said gap narrows from the trailing edge of the main blade in the direction of the leading edge of the main blade.

11. A windmill rotor according to claim 10, wherein each said secondary blade is more flexible than its associated main blade and is weighted so that at high rotational speeds said gap will be reduced in width by centrifugal force.

12. A windmill rotor according to claim 11, wherein such weighting of each secondary blade is concentrated at the trailing edge thereof whereby at high rotational speeds the direction of narrowing of said gap is reversed.

* * * * *